Nov. 26, 1935.  W. E. MOORE  2,022,007
OVERLOAD CUT-OUT FOR STOKER MOTORS
Original Filed Dec. 14, 1931
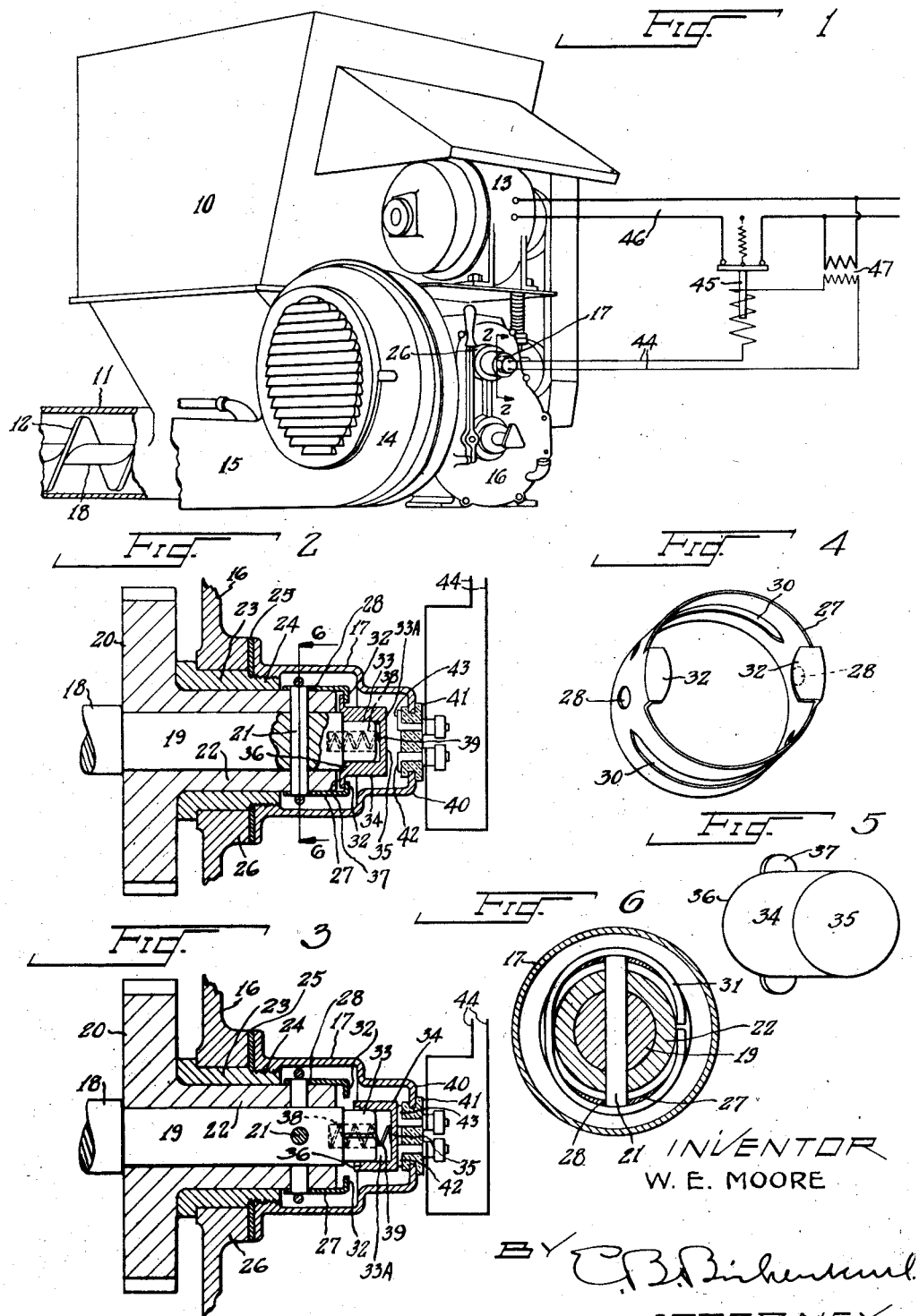
INVENTOR
W. E. MOORE
ATTORNEY Patented Nov. 26, 1935

2,022,007

UNITED STATES PATENT OFFICE 2,022,007

OVERLOAD CUTOUT FOR STOKER MOTORS

Wilfred E. Moore, Cleveland, Ohio

Application December 14, 1931, Serial No. 581,044
Renewed April 29, 1935

9 Claims. (Cl. 192—150)

This invention relates generally to coal burning stokers, and particularly to an overload cut-out for stoker motors.

The main object of this invention is to provide a means for automatically stopping the stoker motor when it is objectionably overloaded, thereby protecting the mechanism of the stoker and the motor itself from injury, and at the same time preventing air from being fed to a fuel bed without fuel and permitting the fuel to burn down to the tuyères and finally cause the destruction thereof.

These, and other objects, will become more apparent from the specification following as illustrated in the accompanying drawing, in which:

Fig. 1 is a perspective view of a stoker with the tuyère section omitted and with a portion of the fuel duct broken away in section.

Fig. 2 is a section taken along the line 2—2 in Fig. 1 and showing the cut-out in a motor operating position.

Fig. 3 is a view similar to Fig. 2 but showing the cut-out in an over-load position.

Fig. 4 is a perspective view of the cylindrical shell of my device.

Fig. 5 is a perspective view of the plunger.

Fig. 6 is a transverse section along the line 6—6 in Fig. 2.

Similar numbers of reference refer to similar parts throughout the several views.

Referring in detail to the drawing, in order to illustrate this invention there is shown the usual form of hopper 10 from which fuel is fed through a fuel duct 11 into a retort (not shown) by a fuel feed screw 12. The usual operating motor 13, fan casing 14 and air duct 15 are also illustrated, as well as the gear case 16.

Referring particularly to my invention attention is drawn to the cap 17 which projects from the gear case 16 and within which is contained the operating mechanism of the motor cut-out device.

The fuel feed screw 12 is driven from the shaft 18 through the gearing in the case 16. The end 19 of the shaft 18 is mounted within the gear 20 and is driven thereby through the shear pin 21 which passes through the hub 22 and the shaft end 19. The hub 22 journals in the bushing 23 whose threaded end 24 carries the cap 17. It is desirable to provide a gasket 25 between the end of the cap 17 and the boss 26 in the gear case 16.

The pin 21 is a loose fit in the holes provided therefor and it is adapted to shear when the load on the feed screw 12 becomes excessive. If the motor 13 is permitted to continue to operate after the pin 21 has sheared it is obvious that the fan will supply air to the fuel bed which will not be renewed, owing to the fact that the feed screw 12 has stopped rotating and the fire will eventually burn down to the tuyères, which of course is very detrimental to these elements and frequently occasions the complete renewal thereof. This is due to the fact that the shear pin has been severed caused by the entrance of a foreign substance in the fuel, and the attendant is not aware of the fact that the fuel feed has stopped and air is therefore supplied to the fire while the tuyères are not protected by the incoming green coal.

In order that the motor 13 will shut down the instant the pin 21 shears there is provided a cylindrical shell 27 which slips easily over the end of the hub 22 before the pin 21 is put into place. The shell 27 is provided with holes 28 which register with the holes 29 in the hub 22 through which the pin 21 passes.

Between the holes 28 are formed the slots 30 which receive the spring wire retaining ring 31 which prevents the pin 21 from coming out of its opening, and the pin 21 prevents the shell 27 from slipping off of the hub 22 or rotating with relation thereto. The shell 27 has also a pair of diametrically opposed inturned ears 32, which will be referred to as stops.

The shaft end 19 has its tip 33 reduced in diameter and squared and has slidably mounted thereon a cylindrical plunger 34 having a closed end 35 and an open end 36, through which open end projects outwardly the lugs 37. The plunger 34 is provided with a square recess 33—A which slidably receives the square end 33 of the shaft 19. The shaft end 19 is provided with a recess 38 for a spring 39 which urges the plunger 34 outwardly.

In the end 40 of the cap 17 is an insulator bushing 41 in which are mounted the contacts 42 and 43. The contacts 42 and 43 are joined by the wires 44 to the electrically operated switch 45 which normally closes a gap in the motor circuit 46, but which, when energized, opens this gap and causes the motor 13 to cease operating. It is preferable to operate the switch 45 from the transformer 47.

The operation of the device is as follows: Assuming that the stoker is operating and the parts are in the position shown in Fig. 2 and the feed screw 12 becomes overloaded causing the pin 21 to shear (as shown in Fig. 3), the lugs 37 will disengage the ears 32 and the plunger 34 will move outwardly coming into engagement with the two contact points 42 and 43 thereby energizing the switch 45 and stopping the motor. Obviously, the same action may cause a visible or audible signal to be given, although the outstanding feature of this device is to protect the stoker from unnecessary and possibly destructive operation.

I claim:

1. An overload cut-out for stoker motors consisting of a drive gear having a hub on one side thereof, a feed screw shaft within said hub, a shell surrounding said hub having a pair of inturned stops on the outer end thereof, a shear pin passing through said shell hub and shaft, a spring-urged plunger held in a retracted position by said stops, and a pair of contacts adapted to be bridged by a releasing movement of said plunger occasioned by a shearing of said pin and a subsequent unlatching of said plunger.

2. An overload cut-out for stoker motors consisting of a cylindrical band having a pair of inturned stops on one side thereof and having a pair of diametrically opposite holes adapted to register with the shear pin holes of a feed screw drive, a plunger slidably mounted on the end of the feed screw shaft and adapted to be rotatably driven thereby, said plunger having out-turned lugs normally engaging said stops when said shear pin is intact.

3. An overload cut-out for stoker motors consisting of a cylindrical band having diametrically opposite pin holes formed therein through which the shear pin of a feed screw worm can pass, a slidable plunger mounted on the end of said feed screw and rotatably driven thereby, spring means for urging said plunger outwardly, a latch between said plunger and band whereby a relative rotative movement of said band and plunger shall release said plunger and permit same to move along the axis of said feed worm, and a cap for housing said band and plunger including a pair of contacts in the path of said plunger adapted to be bridged by the outward movement thereof.

4. A device of the class described comprising a round driven shaft having a square end, a plunger slidably mounted on said squared end, a spring between said plunger and squared end for urging same apart, said plunger having a pair of outturned lugs extending therefrom, a driving element rotatably mounted on said round shaft, a shear pin forming a driving connection between said round shaft and driving element, a pair of ears carried by said driving element arranged to engage said lugs for the purpose of holding said plunger in a retracted position when said shear pin is intact, and a pair of spaced contacts in the path of said slidable plunger capable of being bridged thereby when said pin is sheared by an over-load and said lugs are turned away from engagement with said ears.

5. The substance of claim 2 together with a retaining ring encircling said shell, said shell having grooves formed therein between its pin holes for the reception of said retaining ring.

6. The combination of a driving member and a driven member, a shearing connection between said members, a cap secured to said driving member, a member rotatively secured to said driven member, a connection between said cap and said last named member whereby upon shearing of said shearing member said last named member will move endwise for operating a switch.

7. In combination, a shaft, a coaxial member, a motor, a working part, a shear pin connecting said member and said shaft so that the motor drives the working part, two cooperating devices extending beyond the free end of the shaft and having relative axial movement, one of said devices rotating with the member and the other rotating with the shaft, and means for cutting off the supply of power to the motor upon relative axial movement of said devices.

8. In a stoker, a shaft, a coaxial sleeve, an electric motor, a feed screw, a shear pin connecting the sleeve and shaft so that the motor drives the feed screw, two cooperating devices extending beyond the free ends of the shaft and sleeve and having relative axial movement, one of said devices rotating with the sleeve and the other rotating with the shaft, and means for breaking the current to the motor upon relative axial movement of said devices.

9. In combination, four elements rotating about a single axis including a driving member, a driven member and two electric current controlling devices, one of said devices having axial movement, a shear pin to cause the four elements to rotate as a single unit, and means to cause one of the two devices to move axially upon relative rotation of the two members when the pin is sheared.

WILFRED E. MOORE.